United States Patent Office 3,377,261
Patented Apr. 9, 1968

3,377,261
WATER-SOLUBLE BIAXIALLY ORIENTED
POLY(ETHYLENE OXIDE) FILM
Frede H. Ancker, Warren Township, Bound Brook, N.J., assignor to Union Carbide Corporation, a corporation of New York
No Drawing. Filed July 19, 1963, Ser. No. 296,372
9 Claims. (Cl. 204—159.14)

This invention relates generally to self supporting poly(ethylene oxide) films and, more particularly, to a water-soluble, biaxially oriented poly(ethylene oxide) film and a process for producing the same.

Films made from high molecular weight poly(ethylene oxide) resins are completely soluble in water at temperatures ranging from well below room temperature to very close to the boiling point of water. Such films are of considerable commercial interest for packaging premeasured amounts of materials which are used in aqueous and dispersions. Due to the low toxicity of poly(ethylene oxide) resins, these films are also of interest for a variety of pharmaceutical and cosmetic applications. These films would be even more desirable if they could be biaxially oriented to improve their strength and clarity and to render them heat-shrinkable. However, the poly(ethylene oxide) films have not been successfully biaxially oriented heretofore because of their very low melt strength (commonly referred to as "hot-shortness"), excessive necking or line-drawing, and severe stress whitening.

It is, therefore, the main object of the present invention to provide a self-supporting, water-soluble, biaxially oriented poly(ethylene oxide) film and a process for producing the same.

It is another object of the invention to provide such a film which is clear, tough, and heat-shrinkable.

It is a further object to provide a process for producing such a film without excessive necking or stress whitening.

Polymers of ethylene oxide contain the basic structural unit ($-CH_2CH_2O-$)$_n$, wherein the integer $n$, can vary from small integral values up to $1 \times 10^6$ or even greater. The relatively low molecular weight polymers of ethylene oxide (having molecular weights up to about 20,000) are brittle waxes not capable of being formed into self-supporting films. Accordingly, the term "self-supporting" as applied to the poly(ethylene oxide) films of this invention refers to the films of a relatively high molecular weight polymer of ethylene oxide characterized (prior to irradiation) by an intrinsic viscosity in the range of about 0.5 to about 36.0 when measured in water at 20° to 30° C., which corresponds to an average molecular weight range of about 50,000 to about 10,000,000.

In accordance with the present invention, it has now been discovered that a self-supporting oriented ethylene oxide polymer film can be provided which has unexpectedly higher solubility rate in water, is surprisingly clear, and is tougher and stronger than other ethylene oxide polymer films heretofore available. This film is prepared by forming an ethylene oxide polymer into a self-supporting film; subjecting the film to high energy radiation in a dose of at least about 0.5 megarep but less than that dose sufficient to cause incipient gel formation in the polymer, at a temperature less than the crystalline melting point of the ethylene oxide polymer; heating the irradiated polymer film to an orientation temperature, stretching the film at such orientation temperature, and rapidly quenching the stretched film under tension to set the orientation in the polymer.

It has been found that when the water-soluble ethylene oxide films are irradiated within this critical dose range, the resulting film is not only readily orientable, but retains complete water-solubility. In fact, the irradiated films actually exhibit even higher solubility rates than the corresponding unirradiated films. This result was quite unexpected since improved orientability of polymer films after radiation treatment generally is ascribed to gel formation, which means lower solubility.

The term "reduced viscosity" as used herein refers to the values determined at a concentration of 0.2 gram of polymer per 100 milliliters of water at 23° C. An empirical relationship between this reduced viscosity (RV) and the intrinsic viscosity (IV) of the subject polymers is as follows: $RV = IV + .08(IV)^2$ The term "rep" as used herein refers to the dose of ionizing radiation which deposits 84 ergs per gram of absorber.

The term "incipient gel dose" as used herein refers to the radiation dosage at which at least five weight percent of the polymer being irradiated becomes insoluble in water at room temperature.

The term "ethylene oxide polymer" as used herein refers to those polymers having a predominant amount of ethylene oxide polymerized therein. Included of course are the ethylene oxide homopolymers and copolymers of ethylene oxide with up to 20 weight percent of other copolymerizable monomers, such as other alkylene oxides, alkenylene oxides, and arylene oxides. These polymers are characterized by complete solubility in water at room temperature.

In addition to the ethylene oxide polymer, the starting resin employed in the present invention may contain up to about 100 weight percent, based on the original polymer, of other water-soluable additives such as stabilizers, plasticizers, fillers, dyes, pigments, and the like. Particularly desirable additives are the low molecular weight poly(ethylene oxide) waxes; low molecular weight interpolymers of ethylene oxide with other alkylene, alkenylene, or arylene oxides; liquid or semi-solid water-soluble plasticizers such as polyethylene glycol, polypropylene glycol, glycerol, carbohydrates, organic and inorganic esters such as glycerol triacetate, triethyl citrate, and triethyl phosphate; and water-soluble soaps and detergents such as alkali metal or ammonium soaps of fatty or sulfonated organic acids, and non-ionic detergents such as ethylene oxides adducts of phenol and substituted phenols.

The starting resin is formed into a film by extrusion, calendering, casting, or any other suitable method. The film may be formed in either flat or tubular form. Since film-forming methods are well known in the art, they will not be described in detail herein.

After the film has been formed, it is subjected to a radiation dosage sufficient to render the film orientable and to improve the solubility rate of the film in water. In general, the radiation dosage should be at least about 0.5 megarep, but below the incipient gel dose of the polymer. In other words, the radiation dosage is controlled so that sufficient molecular change (branching) is attained to permit the film to be oriented, but below the level at which a three-dimensional, cross-linked network (gel) is formed in the film. Radiation dosages below about 0.5 megarep do not sufficiently alter the properties of the polymer to permit the irradiated film to be oriented in a continuous manner, while dosages above the incipient gel dose produce an excessive gel fraction in the polymer and consequently render the film at least partially insoluble.

The incipient gel dose, and thus the optimum dosage range, for any particular film in the present process depends on a number of factors. For example, the incipient gel dose increases with increasing amounts of low molecular weight additives in the polymer being irradiated and also with increasing amounts of oxygen present in the atmosphere environment and/or absorbed in the film. Conversely, the incipient gel dose decreases with increasing polymer molecular weight and decreases with increasing moisture content in the film and with increasing dose rates. In the case of most of the film compositions, the optimum radiation dosage is from about 2 to about 8 megareps, and the upper dosage limit is about 50 megareps.

The particular source of ionizing radiation is not critical in this invention. While the subsequent examples employ electrons accelerated from a two million volt Van de Graff electron accelerator, other sources of high energy electrons such as resonance transformers or beta rays from radioactive isotopes, as well as various sources of gamma rays, X-rays, protons, deuterons, or alpha particles may be employed. Gamma rays may be obtained from cobalt 60 or from a Van de Graff electron accelerator equipped with a gold or tungsten target. Alpha particles can be obtained from radioisotopes such as polonium 210.

After the film has been irradiated, it is oriented by stretching at an orientation temperature, i.e., a temperature above that at which the film becomes drawable and orients when stretched and below that at which the film thins out without appreciable orientation when stretched. The film temperature is preferably in the range of about 10° C. above the melting point to about 30° C. below the melting point of the film. In the case of the polymers employed in this invention, it has been found that it is beneficial first to increase the temperature of the film above the melting point of the polymer and then adjust the temperature to the desired orientation temperature. The film is preferably stretched in both the machine direction and the transverse directions so that the film becomes biaxially oriented. Stretch orientation of polymeric films is well known to those skilled in the art, and the orientation steps in the present process may be achieved by any of the known methods. Since it is generally preferred to irradiate the film in sheet form, rather than in tubular form, because of the geometry of existing radiation equipment, it is also generally preferred to orient the film in sheet form. For example, a preferred orientation method and apparatus suitable for use in the inventive process is described in detail in U.S. Patent No. 2,968,067 to C. L. Long and references cited therein, and in the article entitled, "Biaxially Oriented Polypropylene Film," J. R. Olson and E. S. Perry, Modern Plastics, August 1962. After the film has been stretched, it is rapidly cooled or quenched under tension to set the orientation in the polymer.

The irradiated, oriented film produced by the aforedescribed process is not only strong and heat shrinkable because of the orientation thereof, but is also characterized by complete solubility in water at temperatures ranging from about 70° F. to about 200° F. The irradiated, oriented film also exhibits an increased watersolubility rate with respect to the otherwise identical but unirradiated and unoriented film. In fact, the water-solubility rate of the irradiated, oriented film is generally at least twice as great as that of the corresponding unirradiated, unoriented film.

The following examples are illustrative of the present invention:

Example I

A batch of poly(ethylene oxide) having a reduced viscosity of 4.3 was fluxed in a Banbury mixer until it reached a temperature of 120° C., and then dropped on a two-roll mill. The molten resin was transferred to a calender and calendered into 10-mil film at roll temperatures in the range of 90 to 120° C. This film was then exposed to high energy electron radiation in air from a two million electron volt, 0.5 kilowatt Van de Graff generator. Samples were taken at dose levels of 5, 10, 25, and 50 megareps.

The irradiated samples were then biaxially stretched in a conventional "Formvac Sheet Tester," which is described in 22 Plastics, 366–368, September 1957 (London). In this device, the film sample is clamped between two rings and heated by a hot plate to a preset temperature. The hot plate is then removed, and the film is biaxially stretched by lowering the rings around a cylinder having a smaller diameter than the rings. Sticking of the hot plastic to the edge of the cylinder is prevented by a woven fabric sleeve which covers the cylinder and travels over the cylinder as the rings move downward. The biaxial orientability of the film is then measured as the maximum downward travel of the rings or as the maximum reduction in thickness of the film before it breaks.

The film samples were heated until they just became clear, i.e., to a temperature slightly above the optical melting point of the film (150° F.) and then immediately stretched. It was found that an unirradiated control sample could be stretched to a final thickness of only 7 to 8 mils before breakage. In contrast, the 5-megarep sample could be stretched to a final thickness of 0.1 mil (one percent of the original thickness) without breakage or formation of holes. The 10-megarep and 25-megarep samples also stretched quite easily with the maximum thickness reduction decreasing with increasing dosages. The 50-megarep sample was too highly crosslinked to allow any permanent stretching.

The samples were also tested for solubility in water at room temperature. The 5-megarep sample was completely soluble, while the solubility of the other samples decreased with increasing dosages. The 50-megarep sample was practically insoluble.

The biaxially oriented samples were transparent, fully oriented (as evidenced by lack of necking during manual stretching), and showed no signs of stress-cracking. Unoriented films of the same composition are notorious for lacking all of these qualities.

Example II

A poly(ethylene oxide) resin having a reduced viscosity of 5.5 was formed into a film, irradiated, and biaxially stretched as described in Example I. A small amount (0.05 weight percent) of phenothiazine was added to the resin as a stabilizer. Samples were taken at dose levels of 1, 2, 3, 4, 5, 6, 8, and 10 megareps. The biorientability and water-solubility of the samples were as follows (rating: 1—poorest, 5—best):

| Radiation dose (megareps) | 0 | 1 | 2 | 3 | 4 | 5 | 6 | 8 | 10 |
|---|---|---|---|---|---|---|---|---|---|
| Biorientability | 1 | 1 | 4 | 5 | 5 | 5 | 5 | 5 | 5 |
| Water-solubility | 5 | 5 | 5 | 3 | 2 | 1 | 1 | 1 | 1 |

Example III

A composition of 100 parts by weight of the poly(ethylene oxide) employed in Example II, 20 parts by weight ethylene oxide adduct of a substituted phenol and 0.05 part by weight phenothiazine was formed into a film, irradiated, biaxially stretched, and tested as described in Example I. The results were as follows:

| Radiation dose (megareps) | 0 | 1 | 2 | 3 | 4 | 5 | 6 | 8 | 10 |
|---|---|---|---|---|---|---|---|---|---|
| Biorientability | 1 | 1 | 2 | 4 | 5 | 5 | 5 | 5 | 5 |
| Water-solubility | 5 | 5 | 5 | 5 | 5 | 5 | 5 | 5 | 3 |

It can be seen that the addition of the plasticizer increased and broadened the optimum dosage range. Also, it was noted that the irradiated samples dissolved faster than the unirradiated control samples.

Example IV

A composition of 100 parts by weight of the poly(ethylene oxide) employed in Example II, 20 parts by weight of glycerol triacetate, and 0.05 part by weight of phenothiazine was formed into a film, irradiated, biaxially stretched, and tested as described in Example I.

The results were as follows (drawdown ratio refers to ratio of film thickness before stretching to film thickness after stretching).

| Radiation dose (megareps) | 0 | 2 | 4 | 6 | 20 |
|---|---|---|---|---|---|
| Biorientability (drawdown ratio) | <5 | ----- | 45 | 60 | 60 |
| Water-insolubles (percent) | 0.1 | 0.1 | 0.1 | 0.1 | 18.7 |

It can be seen that the different plasticizer had the same effect as the plasticizer in the previous example.

Example V

Samples of film having the same composition as in Example II were formed, irradiated, and biaxially stretched as described in Example I. The samples were then tested for reduced viscosity in a 0.1% aqueous solution at 23° C., with the following results:

| Radiation dose (megareps) | 0 | 2 | 4 | 6 |
|---|---|---|---|---|
| Drawdown ratio | <5 | 2 | 200 | 150 |
| Reduced viscosity | 4.44 | 2.86 | 1.84 | (¹) |

¹ Sample partly gelled.

It can be seen that the viscosity decreases in the pregelation range of radiation doses. It is believed that this is the explanation for the faster solubility rates for the irradiated samples.

Example VI

Samples of film having the same composition as in Example III were formed, irradiated, and biaxially stretched as described in Example I. The samples were then tested for reduced viscosity in a 0.1% aqueous solution at 23° C., with the following results:

| Radiation dose (megareps) | 0 | 2 | 4 | 6 |
|---|---|---|---|---|
| Drawdown ratio | <5 | 3 | 10 | 30 |
| Reduced viscosity | 3.75 | 1.93 | 1.18 | 1.27 |

Again the viscosity decreased in the pre-gelation range, as in the previous example.

Example VII

Samples of film having the same composition as in Example III were formed, subjected to an irradiation dosage of 6 megareps, and biaxially stretched as described in Example I. Prior to the irradiation treatment, the samples were preconditioned for 10 days in atmospheres varying in humidity. The samples were tested for biorientabiltiy and water-solubility, with the following results:

| Preconditioning humidity (percent) | 0 | 52 | 85 |
|---|---|---|---|
| Biorientability (drawdown ratio) | 150 | 30 | 50 |
| Water insolubles (percent) | 0.2 | 0.2 | 15.4 |

It is seen that the incipient gel dose decreases with increasing moisture content in the film.

Example VIII

Samples of film having the same composition as in Example III were formed, irradiated, biaxially stretched, and tested as described in Example I above. Two of the samples were irradiated in solid form at 25° C., while the other two samples were irradiated in molten form at 70° C.

|  | Solid (25° C.) | | Molten (70° C.) | |
|---|---|---|---|---|
| Radiation dose (megareps) | 6 | 20 | 6 | 20 |
| Biorientability (drawdown ratio) | 30 | 100 | ----- | ----- |
| Water insoluble (percent) | 0.3 | 21.2 | 0.3 | 20.2 |

It can be seen from this data that the effect of the irradiation treatment is substantially the same for solid and molten film.

Example IX

Samples of film having the same composition as in Example III were formed, irradiated, biaxially stretched, and tested as described in Example I above. Three of the samples were irradiated in a nitrogen atmosphere, while the other three samples were irradiated in air. The results were as follows:

|  | $N_2$ Atmosphere | | | Air | | |
|---|---|---|---|---|---|---|
| Radiation dose (megareps) | 2 | 4 | 6 | 2 | 4 | 6 |
| Biorientability (drawdown ratio) | 5 | 50 | 150 | 3 | 10 | 30 |
| Water insolubles (percent) | 0.2 | 0.4 | 0.5 | 0.2 | 0.3 | 0.2 |

It can be seen from this data that the nitrogen blanketing improves the orientability of the film without preventing the water solubility.

Example X

An ethylene oxide-styrene oxide copolymer containing six weight percent styrene oxide and having a reduced viscosity of 5.0 was fluxed on a hot two-roll mill, sheeted off, and press-planished in a hydraulic press at about 160° C. into 10-mil plaques. These plaques were then irradiated in air, biaxially oriented, and tested as described in Example I, with the following results:

| Radiation dose (megareps) | 0 | 1 | 2 | 3 | 4 | 5 | 6 | 8 | 10 |
|---|---|---|---|---|---|---|---|---|---|
| Biorientability (drawdown ratio) | <5 | 5 | 8 | 15 | 100 | 200 | 200 | 200 | 200 |
| Water-solubility | S | S | S | S | S | S | G | G | G |

S=soluble. G=gelled.

It can be seen from this data that the copolymer produced the same results as the ethylene oxide homopolymers, but at somewhat higher dose levels.

Example XI

A copolymer of ethylene oxide and propylene oxide containing five weight percent propylene oxide and having a reduced viscosity of 7.5 deciliters per gram was formed into plaques as described in Example XI. These plaques were then treated and tested as in Example I, with the following results:

| Radiation dose (megareps) | 0 | 1 | 2 | 3 | 4 | 5 | 6 | 8 | 10 |
|---|---|---|---|---|---|---|---|---|---|
| Biorientability (drawdown ratio) | <5 | 30 | 150 | >200 | >200 | >200 | >200 | >200 | 50 |
| Water-solubility | S | S | S | G | G | G | G | G | G |

It can be seen from the data that this copolymer produced substantially the same results as the ethylene oxide homopolymers.

Example XII

A copolymer of ethylene oxide and propylene oxide containing five weight percent propylene oxide and having a reduced viscosity of 5.5 deciliters per gram was formed into plaques as described in Example XI. These plaques were then treated and tested as in Example I, with the following results:

| Radiation dose (megareps) | 0 | 1 | 2 | 3 | 4 | 5 | 6 | 8 |
|---|---|---|---|---|---|---|---|---|
| Biorientability (drawdown ratio) | <5 | 5 | 75 | >200 | >200 | >200 | >200 | 200 |
| Water-solubility | S | S | S | IG | G | G | G | G |

IG = Incipient gelation.

It can be seen from the data that this copolymer produced substantially the same results as the ethylene oxide homopolymers.

While various specific embodiments of the present invention have been described herein in some detail, it will be understood that the same are susceptible of numerous modifications within the scope of the invention.

What is claimed is:

1. A self-supporting, biaxially oriented, water-soluble, ethylene oxide polymer film produced by a process comprising:
   (a) forming an ethylene oxide polymer having a molecular weight in the range of about 50,000 to 10,000,000 and an intrinsic viscosity in the range of about 0.5 to 36.0 measured in water at room temperature into a self-supporting film;
   (b) subjecting said film to high energy radiation in a dose of at least about 0.5 megarep but less than that dose sufficient to cause incipient gel formation in the polymer, at a temperature less than the crystalline melting point of the ethylene oxide polymer;
   (c) heating the irradiated polymer film to an orientation temperature and stretching the film at such orientation temperature;
   (d) and rapidly quenching the stretched film under tension to set the orientation in the polymer.

2. A self-supporting, biaxially oriented, water-soluble, ethylene oxide polymer film produced by a process comprising:
   (a) forming a self-supporting film from a water-soluble polymer of ethylene oxide having a molecular weight in the range of about 50,000 to 10,000,000 and an intrinsic viscosity in the range of about 0.5 to 36.0 measured in water at room temperature;
   (b) subjecting said film to a radiation dosage sufficient to render said film orientable and to improve the solubility rate of said film in water;
   (c) stretching said film while maintaining said film at a temperature above that at which the film becomes drawable and orients when stretched and below that at which the film thins out without appreciable orientation when stretched;
   (d) and rapidly cooling the stretched film under tension to set the orientation in the polymer.

3. A self-supporting film as described in claim 2 wherein said water-soluble polymer of ethylene oxide is selected from the group consisting of homopolymers of ethylene oxide and interpolymers of ethylene oxide with at least one other copolymerizable monomer selected from the group consisting of alkylene oxides, alkenylene oxides, and arylene oxides, said interpolymers containing at least about 80 weight percent ethylene oxide polymerized therein.

4. A self-supporting film as described in claim 2 wherein said radiation dosage is between about 0.5 megarep and about 50 megareps.

5. A self-supporting film as described in claim 2 wherein said radiation dosage is between about 2 megareps and about 8 megareps.

6. A self-supporting film as described in claim 2 wherein said film is maintained at a temperature between about 10° C. above and about 30° C. below the melting point thereof during said stretching step.

7. A self-supporting film as described in claim 2 wherein the irradiation of said film is carried out in air.

8. A self-supporting film as described in claim 2 wherein the irradiation of said film is carried out in an atmosphere of controlled humidity and oxygen content.

9. A self-supporting, biaxially oriented, water-soluble, ethylene oxide polymer film produced by a process comprising:
   (a) forming a self-supporting, water-soluble film from a polymer of ethylene oxide, said polymer having a molecular weight in the range of about 50,000 to 10,000,000 and an intrinsic viscosity in the range of about 0.5 to 36.0 measured in water at room temperature;
   (b) subjecting said film to a radiation dosage between about 0.5 megarep and about 50 megarep;
   (c) stretching said film in both the machine and transverse directions while maintaining said film at a temperature of between about 10° C. above and about 30° C. below the melting point thereof;
   (d) and rapidly cooling the stretched film to set the orientation in the polymer.

References Cited

UNITED STATES PATENTS

| 3,022,543 | 2/1962 | Baird et al. | 204—159.2 |
| 3,144,399 | 8/1964 | Rainer et al. | 204—159.2 |

OTHER REFERENCES

Pearson. Chem. Abstr., 53:16100e, Radiostopes, Sci. Research Proc., Intern, Conf., Paris, September 1957.

MURRAY TILLMAN, *Primary Examiner.*

S. H. BLECH, *Examiner.*

R. B. TURNER, N. F. OBLON, *Assistant Examiners.*